United States Patent [19]

Bhat

[11] Patent Number: 5,668,995
[45] Date of Patent: Sep. 16, 1997

[54] METHOD AND APPARATUS FOR CAPACITY PLANNING FOR MULTIPROCESSOR COMPUTER SYSTEMS IN CLIENT/SERVER ENVIRONMENTS

[75] Inventor: Kabekode V. Bhat, Naperville, Ill.

[73] Assignee: NCR Corporation, Dayton, Ohio

[21] Appl. No.: 231,538

[22] Filed: Apr. 22, 1994

[51] Int. Cl.$^6$ .................................................. G06F 15/00
[52] U.S. Cl. ................................. 395/674; 395/500
[58] Field of Search ................................. 395/650, 700, 395/500

[56] References Cited

U.S. PATENT DOCUMENTS

| | | | |
|---|---|---|---|
| 4,751,635 | 6/1988 | Kret | 395/701 |
| 4,841,441 | 6/1989 | Nixon et al. | 395/50 |
| 4,888,771 | 12/1989 | Benignus et al. | 395/183.02 |
| 4,949,278 | 8/1990 | Davies et al. | 395/50 |
| 5,133,045 | 7/1992 | Gaither et al. | 395/51 |
| 5,263,164 | 11/1993 | Kannady et al. | 395/651 |
| 5,515,524 | 5/1996 | Lynch et al. | 395/500 |

Primary Examiner—Kevin A. Kriess
Assistant Examiner—John Q. Chavis
Attorney, Agent, or Firm—George H. Gates

[57] ABSTRACT

A computer-implemented capacity planning system for multiprocessor computer systems used in client/server environments. The capacity planning system provides a correctly sized and configured computer system in response to user specified requirements. The user specified requirements comprise workload parameters. The generated output from the capacity planning generally comprises a recommended multiprocessor computer system, the number of processors needed in the system, the amount of memory required, and the configuration of a disk subsystem suitable for the system, including the number of disk drives, the size of each of the disk drives, and how they should be configured for best performance. The generated output from the capacity planning system further comprises a list price, discounted price, maintenance costs and price/performance indicator for the identified computer system configuration. The capacity planning system can also generate output describing probable system configurations and pricing from other vendors to provide a competitive analysis for the user. The output also includes the average response time performance of the configured system for the specified workload, a summary of the resource utilization, and a bottleneck analysis.

20 Claims, 3 Drawing Sheets

METHOD AND APPARATUS FOR CAPACITY PLANNING FOR MULTIPROCESSOR COMPUTER SYSTEMS IN CLIENT/SERVER ENVIRONMENTS

BACKGROUND OF THE INVENTION

1. Field of the Invention

The present invention generally relates to computer-implemented capacity planning systems, and in particular, to a capacity planning system for multiprocessor computer systems used in client/server environments.

2. Description of Related Art

Typically, customers can choose from a bewildering array of computer system hardware, software and networking products to meet their current and future needs. For example, most multiprocessor computer systems are highly configurable in terms of the number of processors, number and types of disks, and memory modules. Such systems have different configuration and connectivity limitations, performance capabilities, and pricing. Often, these products are expected to coexist and communicate with those of other vendors.

A key business problem involves proposing a validly configured, cost effective and competitive multiprocessor computer system for client-server environments to meet a customer's specific requirements and provide a known level of performance. In this context, a salesperson needs assistance in assessing the customer's on-going needs, and in matching those needs with an appropriate cost effective product configuration. The capability to quickly configure the right system to meet customer expectations is vital for business success in the marketplace.

There is no substitute for the judgments of seasoned salespersons in assessing the needs of their customers. However, the complexity of products, pricing considerations, and performance requirements demand either extra help in terms of technical expertise or assistance from appropriate tools to be competitive at the market place. Existing ad hoc approaches may lead to either an over-priced, over-configured solution that could mean loss in marketshare, or an under-configured solution that does not meet customer expectations, thereby hurting the credibility of the vendor. Sizing the computer system requires time and a correct understanding of the customer's application and the performance of the proposed computer systems. In the prior art, there exists no tool for sizing complex multiprocessor computer systems used in client/server environments.

SUMMARY OF THE INVENTION

To overcome the limitations in the prior art described above, and to overcome other limitations that will become apparent upon reading and understanding the present specification, the present invention discloses a computer-implemented capacity planning system for multiprocessor computer systems used in client/server environments. The capacity planning system provides a correctly sized and configured computer system in response to user specified requirements. The user specified requirements comprise workload parameters. The generated output from the capacity planning generally comprises a recommended multiprocessor computer system, the number of processors needed in the system, the amount of memory required, and the configuration of a disk subsystem suitable for the system, including the number of disk drives, the size of each of the disk drives, and how they should be configured for best performance. The generated output from the capacity planning system further comprises a list price, discounted price, maintenance costs and price/performance indicators for the identified computer system configuration. The capacity planning system can also generate output describing probable system configurations and pricing from other vendors to provide a competitive analysis for the user. The output also includes the average response time performance of the configured system for the specified workload, a summary of the resource utilization, and a bottleneck analysis.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
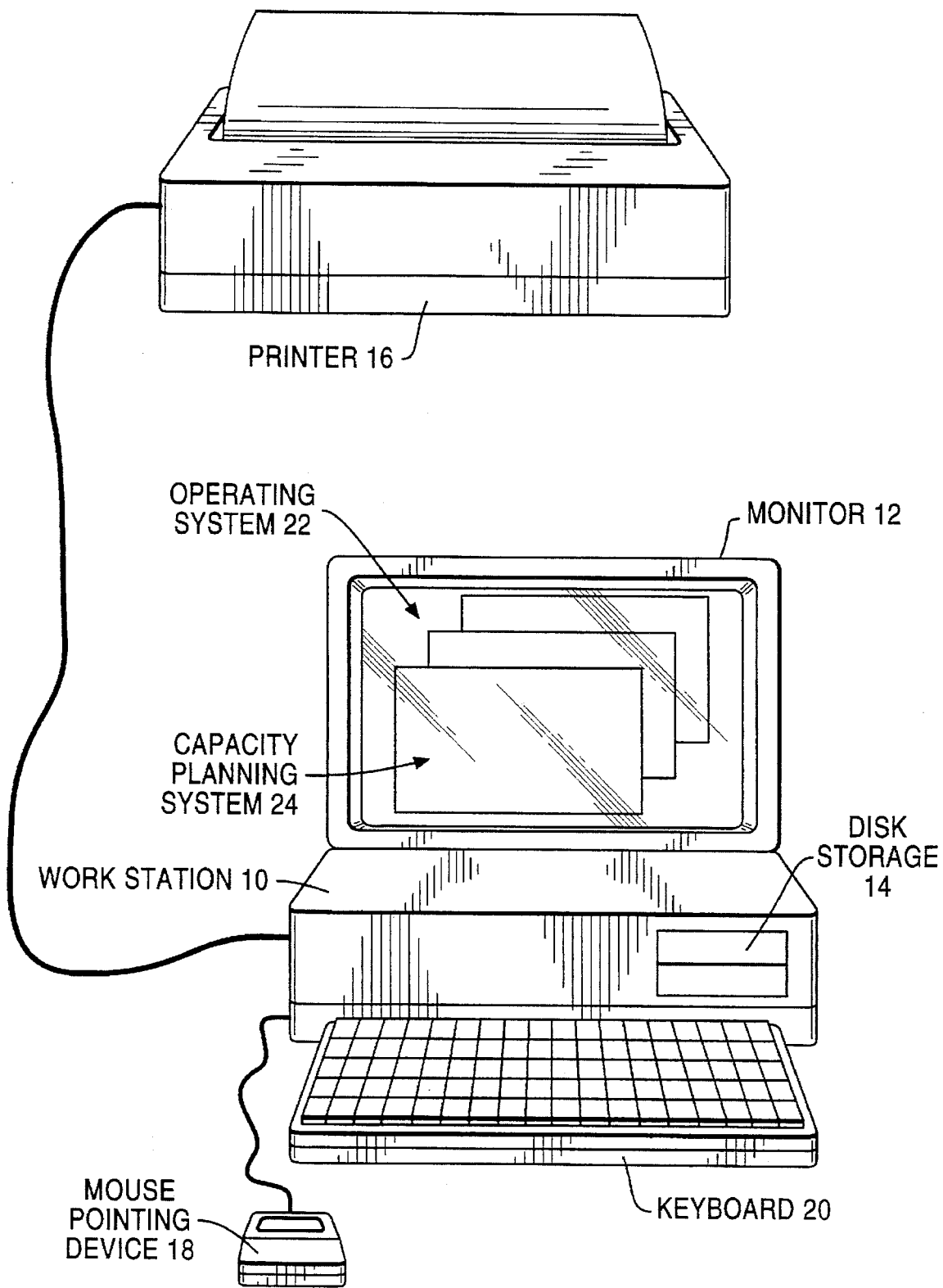
FIG. 1 illustrates one possible embodiment of the present invention.

FIG. 1 illustrates one possible embodiment of the present invention. The present invention comprises a computer-implemented capacity planning system that assists a user through the process of sizing and configuring multiprocessor computer systems. The present invention typically is implemented using a computer 10. It is envisioned that attached to the computer 10 will be monitor 12, disk storage 14, and printer 16 peripherals. Also included in the preferred embodiment are input devices, for example, a mouse pointing device 18 and a keyboard 20. In addition, the computer 10 operates under the control of an operating system 22. The present invention itself is a computer program 24 and database operating under control of the operating system 22.

The present invention provides an interactive computer-implemented tool that is fast and easy to use, enhances the productivity of salespersons, provides a competitive advantage for vendors, and provides a cost effective way of doing business for vendors. In most cases, the present invention is intended to be vendor specific, but specialized for set or subset of computer system configurations. The present invention is founded on an understanding of the typical marketing and sales process for computer systems.

The present invention reduces the burden of doing detailed configurations. Once the rules have been laid down, the present invention faithfully and accurately produces the configuration, associated pricing and maintenance costs for a specified set of user constraints. It is, in essence, an attempt to automate the marketing and sales process to save substantial amounts of time for salespersons. The saved time, in turn, can be spent on exploring additional prospects. The present invention also speeds up a vendor's response to customer requests and needs. However, understanding the customer requirements and configuring the appropriate solution is an interactive process. Thus, the present invention is not intended as a replacement for the wisdom of salespersons, marketing executives or technical support personnel.

The present invention accepts information regarding the customer's application, including the data size, processing time, and other characteristics of the transactions performed by the application, and then mathematically models and suggests an optimum configuration of a multiprocessor computer system as a solution. More specifically, the present invention accepts inputs for a specific client-server environment such as the number of users, amount of disk storage required, average number of transactions per second per user, average input data size per transaction, average output data size per transaction, average processor service time per transaction, average number of disk accesses per transaction, average disk service time per disk access, number of networks, and network bandwidth. The present invention suggests reasonable default values for the environment, which can be overridden by the user.

In addition, the mathematical model can take into account other variables not related to the application being measured. For example, some portion of the system's resources may be consumed by other tasks, such as periodic database updates, down time for backups, downloading data from other systems, etc. These variables are specifically addressed by the present invention using an estimate of the percentage of system resources consumed by such auxiliary processing.

On receiving the inputs, the present invention performs a set of calculations contained in the mathematical model to provide the following outputs: the recommended model of multiprocessor computer system, the number of processors needed in the server, the amount of memory required, and the configuration of a disk subsystem suitable for the system, including the number of disk drives, the size of the disk drives, and how they should be configured for performance. The present invention also generates the list price, discounted price, maintenance cost and price/performance analysis for the proposed system. The present invention can also generate probable system configurations and pricing from other vendors to provide a competitive analysis for the user.

The mathematical model used by the present invention incorporates an understanding of the architecture, performance, configuration rules, and pricing of the vendor's multiprocessor computer systems. It is anticipated that the mathematical model is cognizant of a plurality of different computer systems and architectures provided by the vendor. The mathematical model manipulates the user inputs and determines a configuration satisfying the constraints of the user inputs. Preferably, the mathematical model is validated by appropriate performance measurements from installed systems before being incorporated into the present invention. Generally, the mathematical model uses resource requirements and configuration capabilities of particular systems to determine a solution. The mathematical model also includes pricing constraints so that less expensive solutions are sought before more expensive solutions are considered, thereby assuring the cost effectiveness of the analysis.

The output also includes the average response time performance of the configured system for the specified workload, a summary of resource utilization, and a bottleneck analysis. The average response time performance output generally includes a graph showing the expected response time performance depending on the number of users using the configured system. The output resource utilization generally includes the percentage processor utilization, percentage disk utilization, and percentage network utilization for the specified workload. The output bottleneck analysis generally includes an identification of components that may be overloaded by the customer's application and thereby suggests additional components that may be added to the system to eliminate the bottlenecks.

The performance prediction techniques in the mathematical models are also based on appropriate performance measurements from installed systems before being incorporated into the present invention. Moreover, the present invention is expected to assist a vendor in suggesting appropriate growth paths for customer installations based on these workload and usage patterns. Of course, the numbers obtained from the present invention should be used as guidelines and should not be interpreted as actually measured results.

Figure 2A:
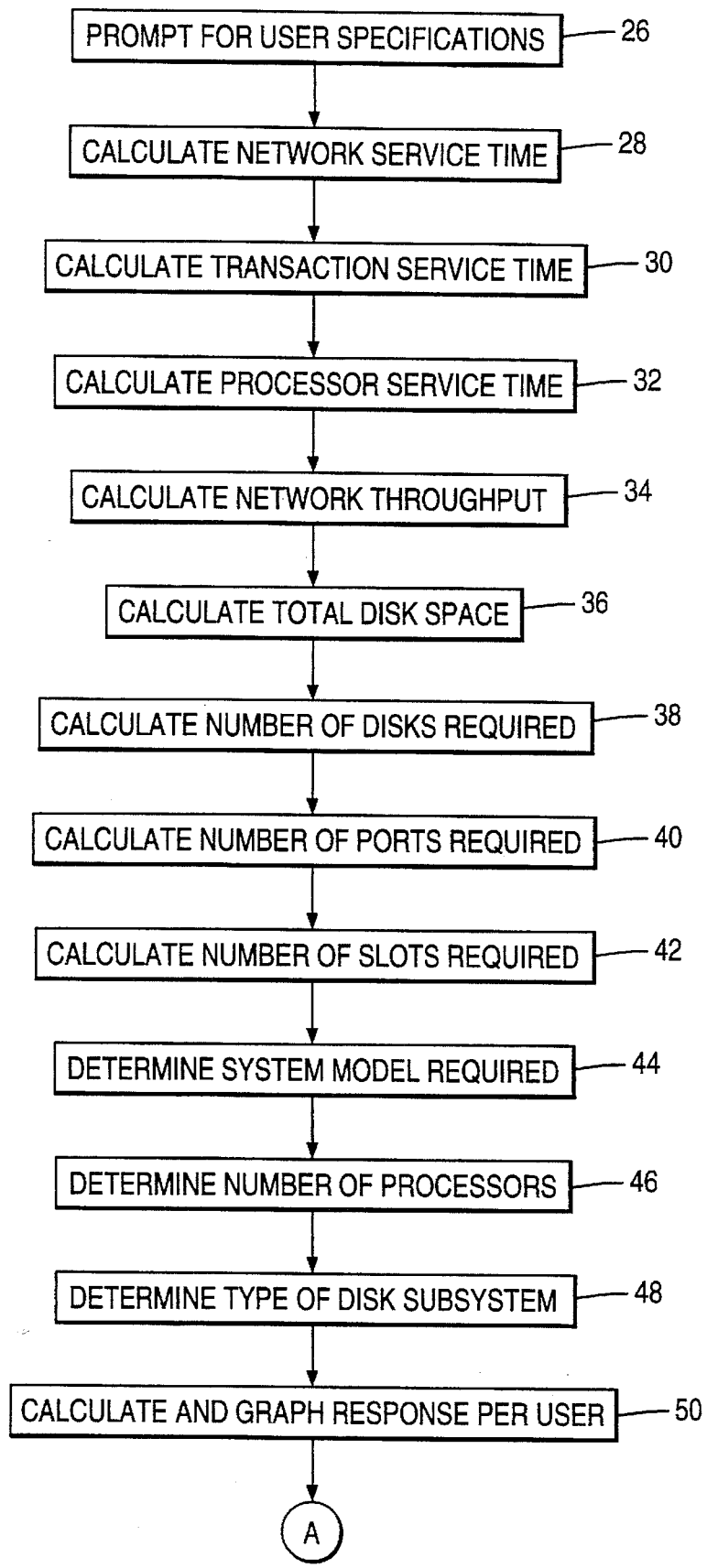
FIGS. 2 (A and B) is a flowchart illustrating the logic of the present invention.
Figure 2B:
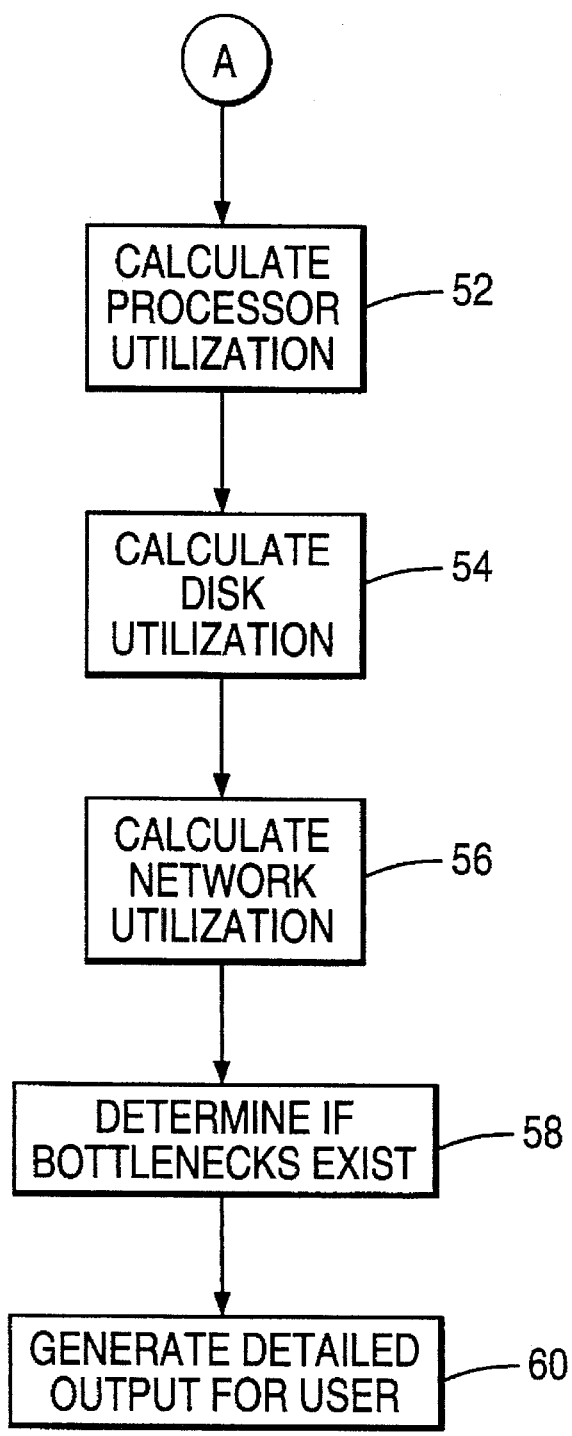

FIG. 2 is a flowchart more specifically illustrating the logic performed by the present invention. Block 26 represents the system prompting for the entry of user specifications. In most cases, the only data that is needed for input would be the numbers of users, the amount of disk space required, and the number of transactions performed per second per user. The input process of the present invention suggests reasonable values for these parameters and a default value is always available for entry. Additional parameters can be entered to more accurately specify the customer's environment, including the number of networks desired, the bandwidth of the network, the input data size per transaction, the output data size per transaction, the number of disk accesses per transaction, the average disk service time per disk access, and the percentage of processor time used for auxiliary tasks. These parameters are typically easily identified for a customer environment.

Blocks 28–42 represent the calculations performed by the present invention in determining the model of multiprocessor computer system to suggest. Block 28 represent the calculation of the network service time per transaction by adding the input data size and output data size per transaction and dividing by the network bandwidth. Block 30 represents the calculation of a transaction service time by adding the processor service time per transaction to the network service time per transaction. Block 32 represents the calculation of the processor service time required by multiplying the transaction service time by the number of transactions per user and the total number of users. Block 34 represents the calculation of the network throughput by adding the input and output data sizes, multiplying the result by the number of users and by the number of transactions per user. Block 36 represents the calculation of the total amount of disk space by adding the disk space needed for the main application with the disk space needed for auxiliary tasks. Block 38 represents the calculation of the number of disk drives required by dividing the disk space by the size of the disk drives. Block 40 represents the calculation of the number of controller ports required by dividing the number of disk drives required by the number of disk drives supported by a single port. Block 42 represents the calculation of the number of controller slots required by dividing the number of ports required by the number of ports supported by a single controller.

Blocks 44–48 represent the selection of the computer system configuration that best suits the customers' needs. The selection process is performed by comparing the values calculated above against tables of values representing a plurality of different computer system configurations. Further, the tables contain information relating to the list price, discounted price, maintenance cost and price/performance analysis for each of the different computer system configurations. Block 44 represents the selection of the model of computer system required based on the number of total processor service time, controller slots, number of ports, disk space, and the network throughput per second. Block 46 represents the selection of the effective number of processors depending on the processor service time. Block 48 represents the determination of the configuration of the disk subsystem depending upon the total number of disk drives required.

Blocks 50–58 represent the calculation of the resource utilization, network utilization and bottleneck analysis. Block 50 represents the graphing of response time versus number of users, wherein the response time is calculated according to:

```
response time = (processor service time/((percentage
of time allocated for the main application)-
(processor service time * current user
increment (from 1 to the maximum users) * number
of transactions per second per user/effective
number of processors))) + (disk service time per
transaction / (1-(user increment * number of
transactions per second per user * disk service
time / number of disk drives)) + (sum of input
and output data size transmitted on the network)
network throughput rate at the client.
```

Block 52 represents the calculation of the processor utilization according to:

```
processor utilization = percentage of processor time
used by auxiliary tasks + (processor service time
per transaction * number of transactions per
second * number of users/effective number of
processors).
```

Block 54 represents the calculation of the disk utilization according to:

```
disk utilization = number of users * number of
transactions per second per user * number of disk
accesses per transaction * disk service time per
disk access/number of disk drives.
```

Block 56 represents the calculation of the network utilization according to:

```
network utilization = number of transactions per user
* number of users * (data input size + data
output size) * 1.2 (for assumed overhead)/
(network bandwidth * number of networks).
```

Block 58 represents the determination of whether any bottlenecks by comparing the number of transactions per second multiplied by the number of users multiplied, by the combined data input size and data output size, with the values for the model of multiprocessor computer system selected above, and identifying when the calculations approach or exceed the values. Block 58 further represents the further identification of potential bottlenecks by identifying when the processor utilization, disk utilization or network utilization exceed a predefined percentage value.

Block 60 represents the generation of a detailed output report for the user describing the solution. The detailed output report provides the recommended model of multiprocessor computer system, the number of processors needed in the system, the amount of memory required, and the configuration of a disk subsystem suitable for the system, including the number of disk drives, the size of the disk drives, and how they should be configured for performance. The detailed output report can be used to suggest appropriate growth paths for customers. The detailed output report also includes the list price, discounted price, maintenance cost and price/performance analysis for the proposed system. It also anticipated that the present invention could perform similar actions using system configurations and pricing from other vendors to provide a competitive analysis for the user.

Another portion of the detailed output report also includes the average response time performance of the configured system for the specified workload, a summary of the resource utilization, and a bottleneck analysis. The average response time performance output generally includes a graph showing the expected response time performance depending on the number of users using the configured system. The output resource utilization generally includes the percentage processor utilization, percentage disk utilization, and percentage network utilization for the specified workload. The output bottleneck analysis generally includes an identification of components that may be overloaded by the customer's application and thus implicitly suggests additional components that may be added to the system to eliminate the bottlenecks.

What is claimed is:

1. A computer-implemented capacity planning system, comprising:

(a) a computer with a monitor coupled thereto;

(b) capacity planning means, performed by the computer and displayed on the monitor, for accepting workload parameters, for identifying a computer system configuration based on the workload parameters, and for outputting a report describing the identified computer system configuration;

(c) wherein the workload parameters are selected from a group comprising a number of users, an amount of disk storage required, an average number of transactions per second per user, an average input data size per transaction, an average output data size per transaction, an average processor service time per transaction, an average number of disk accesses per transaction, an average disk service time per disk access, a number of networks, and a network bandwidth; and (d) wherein the report is selected from a group comprising a recommended multiprocessor computer system, a number of processors needed in the system, an amount of memory required, and a configuration of a disk subsystem suitable for the system, including a number of disk drives, a size of each of the disk drives, and how the disk drives should be configured for performance.

2. The invention as set forth in claim 1, wherein the capacity planning means further comprises means for suggesting reasonable default values for the workload parameters.

3. The invention as set forth in claim 1, wherein the workload parameters are selected from a group further comprising an estimate of a percentage of system resources used by auxiliary tasks.

4. The invention as set forth in claim 1, wherein the report is selected from a group further comprising a list price, a discounted price, maintenance costs for the identified computer system configuration, a price/performance analysis for the identified computer system configuration, probable computer system configurations and pricing from competitors, an average response time performance for the identified computer system configuration, a summary of resource utilization in the identified computer system configuration, and a bottleneck analysis for the identified computer system configuration.

5. The invention as set forth in claim 4, wherein the summary of resource utilization further comprises a graph showing the average response time performance for a specified workload depending on a number of users using the identified computer system configuration.

6. The invention as set forth in claim 4, wherein the summary of resource utilization is selected from a group comprising a percentage processor utilization, a percentage disk utilization, and a percentage network utilization for a specified workload.

7. The invention as set forth in claim 4, wherein the bottleneck analysis comprises an identification of components that may be overloaded by the customer's application and a suggestion of additional components that may be added to the identified computer system configuration to eliminate the bottlenecks.

8. The invention as set forth in claim 1, wherein the means for identifying comprises means for identifying the computer system configuration based on the workload parameters and capabilities of a plurality of computer system configurations.

9. The invention as set forth in claim 1, wherein the means for identifying comprises means for identifying the computer system configuration based on pricing constraints, so that a less expensive computer system configuration is sought before a more expensive computer system configuration is considered, thereby assuring the cost effectiveness of the identified computer system configuration.

10. A method for capacity planning using a computer, comprising the steps of:

(a) accepting, into the computer, workload parameters;

(b) identifying, in the computer, a computer system configuration based on the workload parameters;

(c) outputting, from the computer, a report describing the identified computer system configuration;

(d) wherein the workload parameters are selected from a group comprising a number of users, an amount of disk storage required, an average number of transactions per second per user, an average input data size per transaction, an average output data size per transaction, an average processor service time per transaction, an average number of disk accesses per transaction, an average disk service time per disk access, a number of networks, and a network bandwidth; and (e) wherein the report is selected from a group comprising a recommended multiprocessor computer system, a number of processors needed in the system, an amount of memory required, and a configuration of a disk subsystem suitable for the system, including a number of disk drives, a size of each of the disk drives, and how the disk drives should be configured for performance.

11. The invention as set forth in claim 10, wherein the outputting step further comprises the step of suggesting reasonable default values for the workload parameters.

12. The invention as set forth in claim 10, wherein the workload parameters are selected from a group further comprising an estimate of a percentage of system resources used by auxiliary tasks.

13. The invention as set forth in claim 10, wherein the report is selected from a group further comprising a list price, a discounted price, maintenance costs for the identified computer system configuration, a price/performance analysis for the identified computer system configuration, probable computer system configurations and pricing from competitors, an average response time performance for the identified computer system configuration, a summary of resource utilization in the identified computer system configuration, and a bottleneck analysis for the identified computer system configuration.

14. The invention as set forth in claim 13, wherein the summary of resource utilization further comprises a graph showing the average response time performance for a specified workload depending on a number of users using the identified computer system configuration.

15. The invention as set forth in claim 13, wherein the summary of resource utilization is selected from a group comprising a percentage processor utilization, a percentage disk utilization, and a percentage network utilization for a specified workload.

16. The invention as set forth in claim 13, wherein the bottleneck analysis comprises an identification of components that may be overloaded by the customer's application and a suggestion of additional components that may be added to the identified computer system configuration to eliminate the bottlenecks.

17. The invention as set forth in claim 10, wherein the identifying step comprises the step of identifying the computer system configuration based on the workload parameters and capabilities of a plurality of computer system configurations.

18. The invention as set forth in claim 10, wherein the identifying step comprises the step of identifying the computer system configuration based on pricing constraints, so that a less expensive computer system configuration is sought before a more expensive computer system configuration is considered, thereby assuring the cost effectiveness of the identified computer system configuration.

19. A computer-implemented capacity planning system, comprising:

(a) a computer with a monitor coupled thereto;

(b) means, performed by the computer, for accepting workload parameters, wherein the workload parameters comprise a number of users, disk storage requirements, and performance data related to transactions to be performed by a computer system;

(c) means, performed by the computer, for identifying a computer system configuration based on the workload parameters and capabilities of a plurality of computer system configurations; and (d) means, performed by the computer, for outputting a report describing the identified computer system configuration, wherein the report comprises a recommended computer system configuration and performance data for the recommended computer system based on the workload parameters.

20. The invention as set forth in claim 1, wherein the capacity planning means further comprises means for suggesting reasonable default values for the workload parameters.

* * * * *